United States Patent
Flockhart et al.

(10) Patent No.: US 9,118,765 B2
(45) Date of Patent: Aug. 25, 2015

(54) AGENT SKILL PROMOTION AND DEMOTION BASED ON CONTACT CENTER STATE

(75) Inventors: Andrew D. Flockhart, Thornton, CO (US); Joylee Kohler, Northglenn, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 154 days.

(21) Appl. No.: 13/186,219

(22) Filed: Jul. 19, 2011

(65) Prior Publication Data

US 2013/0022194 A1 Jan. 24, 2013

(51) Int. Cl.
H04M 3/00 (2006.01)
H04M 3/523 (2006.01)

(52) U.S. Cl.
CPC ...... *H04M 3/5233* (2013.01); *H04M 2203/403* (2013.01)

(58) Field of Classification Search
CPC .............................. H04M 3/5233; H04M 3/51
USPC ........................... 379/265.02, 265.05, 265.06
See application file for complete search history.

(56) References Cited

U.S. PATENT DOCUMENTS

| | | | |
|---|---|---|---|
| 5,903,641 A * | 5/1999 | Tonisson | 379/265.12 |
| 6,518,994 B1 * | 2/2003 | Johnson et al. | 348/14.11 |
| 7,949,121 B1 | 5/2011 | Flockhart et al. | |
| 8,116,446 B1 | 2/2012 | Kalavar | |
| 2003/0123640 A1 * | 7/2003 | Roelle et al. | 379/265.06 |
| 2004/0191735 A1 * | 9/2004 | McCormack | 434/219 |
| 2006/0274758 A1 * | 12/2006 | Busko et al. | 370/395.21 |
| 2009/0274291 A1 * | 11/2009 | Barnett et al. | 379/265.11 |
| 2010/0086120 A1 * | 4/2010 | Brussat et al. | 379/265.12 |
| 2011/0255682 A1 | 10/2011 | Flockhart et al. | |
| 2011/0255684 A1 | 10/2011 | Flockhart et al. | |
| 2012/0224682 A1 * | 9/2012 | Zgardovski et al. | 379/266.07 |

OTHER PUBLICATIONS

Official Action for U.S. Appl. No. 13/630,152 mailed May 22, 2013, 9 pages.
U.S. Appl. No. 13/630,152, filed Sep. 28, 2012, Steiner.
Final Action for U.S. Appl. No. 13/630,152 mailed Sep. 12, 2013, 10 pages.
Notice of Allowance for U.S. Appl. No. 13/630,152 mailed Nov. 22, 2013, 8 pages.

* cited by examiner

*Primary Examiner* — Sonia Gay
(74) *Attorney, Agent, or Firm* — Sheridan Ross P.C.

(57) ABSTRACT

A contact center is described along with various methods and mechanisms for administering the same. The contact center proposed herein provides the ability to, among other things, selectively promote and demote agent skills to respond to various changes in contact center conditions. This enables the contact center to respond to unexpected changes in processing conditions without significantly impacting the overall performance of the contact center.

19 Claims, 6 Drawing Sheets

FIG. 1

| AGENT ID | SKILL 1 PROFICIENCY | SKILL 1 ADJUST | SKILL 2 PROFICIENCY | SKILL 2 ADJUST |
|---|---|---|---|---|
| Agent 1 | 3 | Prom = +1; Dem = -1 | 0 | |
| Agent 2 | 4 | Dem = -1 | 2 | Prom = +1; Dem = -1 |
| Agent 3 | 0 | Prom = +1 | 4 | Prom = +1; Dem = -1 |
| Agent 4 | 2 | Prom = +1; Dem = -1 | 2 | Prom = +1; Dem = -1 |
| Agent 5 | 2 | Prom = +1; Dem = -1 | 2 | |
| ... | ... | ... | ... | ... |
| Agent N | 1 | Prom = +0.5; Dem = -0.5 | 3 | Prom = +20%; Dem = -10% |

AGENT SKILL PROMOTION AND DEMOTION BASED ON CONTACT CENTER STATE

FIELD OF THE DISCLOSURE

The present disclosure is generally directed toward communications and more specifically toward contact centers.

BACKGROUND

In certain contact center configurations, reserve agents can be activated to expand the eligible agent pool when a service time goal for a particular skill type has been exceeded. This increases the number of people serving the affected skill and is intended to bring the skill back into line with the skill's objective.

There are a number of limitations to these types of solutions. First, the selection and configuration of reserve agents is complex for users to implement optimally. Second, only one type of goal is supported. Third, the only currently-available solution is to add reserve agents to an eligible agent pool, but there is no consideration of removing agents from a skill when that particular skill is exceeding its objectives.

Indeed, the most common currently-available method for handling fluctuations in contact center work loads is to manually monitor real time reports and then manually move agents into or out of skills as required. While the automated utilization of reserve agents is another more automated method, it is not commonly implemented due to its complexity.

SUMMARY

It is with respect to the above issues and other problems that the embodiments presented herein were contemplated. In prior art contact center systems, an agent's skill level is a key attribute for determining what work the agent should do next. The higher an agent's skill level, the greater the likelihood they will do this type of work.

When a skill fails to meet a skill objective, the system proposed herein can "promote" agents. When an agent is promoted in a skill, his/her skill level is adjusted upwards, making it more likely that the agent will do this type of work. This will help to bring the skill back into compliance with its goals.

Conversely, when a skill is doing better than required, the system can "demote" agents. When an agent is demoted in a skill, his/her skill level is adjusted downwards, making it less likely that the agent will do this type of work. Again, this will help to bring the skill back into compliance with its goals.

The promotion/demotion can be applied to the agent's skill level until they are assigned to a work item or until a particular work item assignment decision has been made, depending upon the implementation. If an agent's skill level was promoted or demoted and that resulted in the agent being assigned a particular work item, once the agent becomes available again, the agent returns to the pool of eligible agents with their original skill level, unless they are promoted/demoted again.

Another advantage of implementing the agent promotions/demotions solution described herein is that match rates are also protected. Rather than opening the skill up to additional agents of any skill level, this solution can limit skill adjustments (normally only by a single level) so that agents with high skill levels continue to service contacts from the skill. Agents with low skill levels will typically do other work in other skills for which they are better skilled, even when they have been promoted.

In some embodiments, agent promotions and demotions can be applied to all agents or to only a subset of agents. In some embodiments, a randomizer can be applied to determine which agents with a particular skill should be promoted or demoted when they become available for new work. For example: only 25% of available agent events result in a promotion. This helps avoid situations where another skill could be starved of agents resulting in severe service problems.

Alternatively, rather than randomization, the system could use another attribute such as occupancy, customer satisfaction score, first call resolution scores, etc. to decide which subset of agents to promote/demote.

In some embodiments, a certain amount of hysteresis could also be built into the logic, which implements the triggering of the promotion/demotion mechanism. This can help reduce excessive switching between a promotion/demotion state and not.

In some embodiments, it may be possible to implement a number of different thresholds, each associated with a different randomization value. Therefore, barely missing a service level goal could result in a small randomization value, which means that only a small number of agents have their skills promoted/demoted when they become available. If the service level goal is being missed by a wide margin, then a higher randomization value may be used, which means that a larger number of agents have their skills promoted/demoted when they become available.

In accordance with at least some embodiments of the present disclosure, a method is provided which generally includes:

determining a state of a contact center; and based on determining the state of the contact center, automatically adjusting, by a work assignment engine, a skill proficiency value assigned to an agent working in the contact center by a predetermined amount until at least one of (i) a predetermined amount of time has passed and (ii) a predetermined event has occurred, wherein the skill proficiency value assigned to the agent is adjusted to accommodate the determined state of the contact center.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
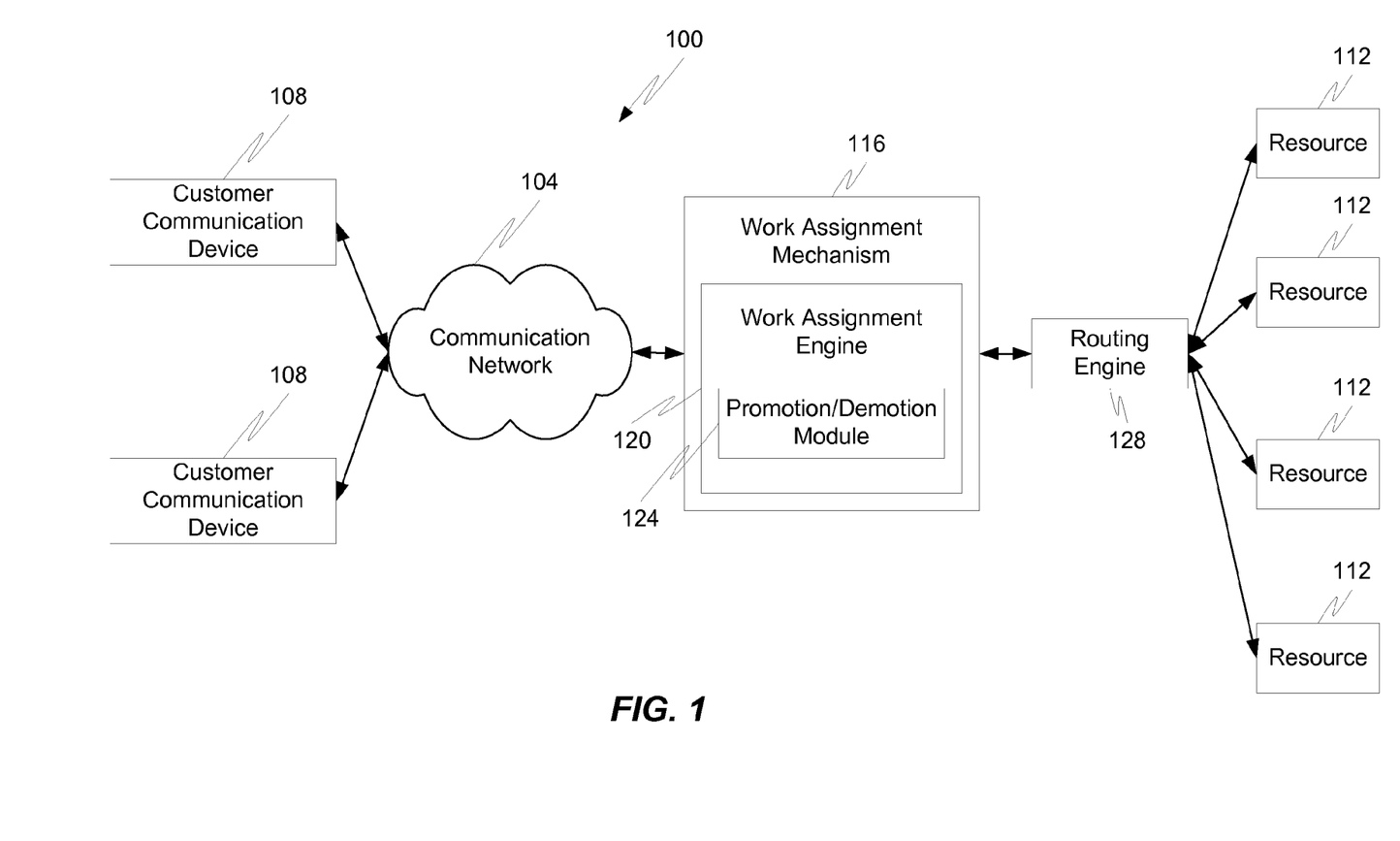
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item assignment decision to a routing engine 128 to connect the communication device 108 which initiated the communication with the assigned resource 112.

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 128. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In some embodiments, the work assignment engine 120 may comprise a promotion/demotion module 124 that enables the work assignment engine 120 to selectively promote and/or demote agent skills on a temporary basis to accommodate changes in the contact center workload. In particular, the promotion/demotion module 124 may be configured to determine that a particular skill (or combination of particular skills) is either failing to meet service level objectives and, in response thereto, selectively promote agent skills until the skill is brought back into compliance with its service level objectives. The promotion/demotion module 124 may also be configured to determine that a particular skill (or combination of particular skills) is exceeding its service level objectives by more than a predetermined amount, in which case the promotion/demotion module 124 is enabled to selectively demote agent skills, thereby allowing agents to help service work items from other skills that are not so far ahead of their service level objectives. Accordingly, the promotion/demotion module 124 provides an automated way for the work assignment engine 120 to gradually increase and/or decrease the number of agents that receive work items from a particular skill without actually moving agents into and out of a skill completely.

Figure 2:
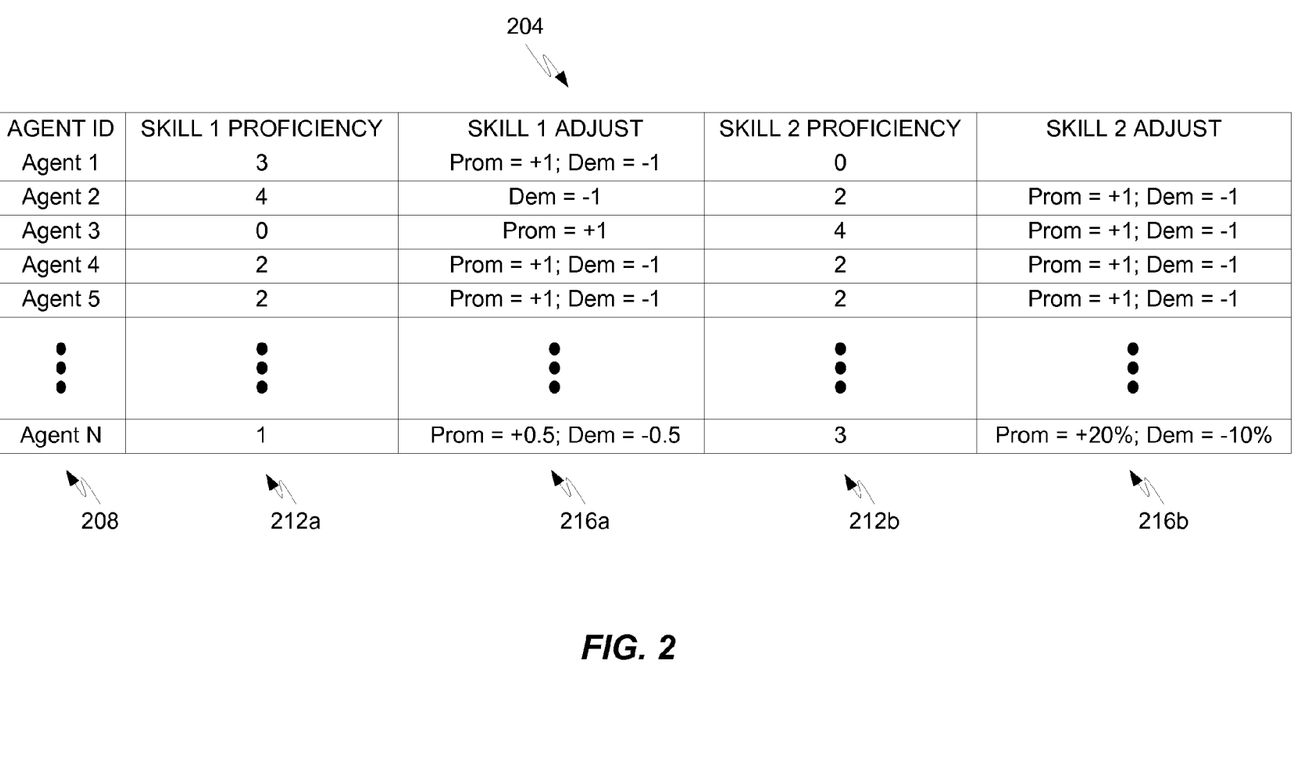
FIG. 2 is a block diagram depicting an example of a data structure used by the work assignment engine in accordance with embodiments of the present disclosure.

With reference now to FIG. 2, a data structure 204 which may be utilized by the work assignment engine 120 and, in particular, the promotion/demotion module 124 will be described in accordance with embodiments of the present disclosure. It should be appreciated that the data structure 204 depicted in FIG. 2 is not necessarily representative of an entire data structure that may be used by the work assignment engine 120 and, in particular, the data structure 204 may represent only a small portion of a larger data structure that is used by the work assignment engine 120 in making work item assignment decisions. Furthermore, although the data structure 204 is depicted as having only two skills and an associated promotion/demotion value associated therewith, it should be appreciated that the data structure 204 may account for a greater or lesser number of skills without departing from the scope of the present disclosure.

In some embodiments, the data structure 204 may comprise a number of fields for storing information that is used by the promotion/demotion module 124 to dynamically and temporarily adjust the skill levels of agents in the contact center.

As some non-limiting examples, the data structure 204 may comprise an agent identification field 208, a number of skill proficiency fields 212a, 212b, and a number of skill adjustment fields 216a, 216b. As noted above, although only two skill proficiency fields 212a and 212b are depicted, the data structure 204 may comprise a greater or lesser number of skill proficiency fields. The same may be true for the skill adjustment fields.

In some embodiments, the agent identification field 208 may store information for uniquely identifying a particular agent or resource 112 operated by an agent within the contact center. Information used to uniquely identify an agent in the contact center may include, without limitation, agent name, employee number, a randomly-assigned number, a social security number, and the like. Information used to uniquely identify resources 112 operated by agents may include, but is not limited to, IP address, MAC address, randomly-assigned numbers, and the like.

The skill proficiency fields 212a, 212b may be used to store information about an agent's proficiency level for a particular skill. In some embodiments, the skill proficiency fields 212a, 212b may be provisioned by a contact center administrator or manager and an agent's proficiency level for a particular skill may be assigned based on whether or not the agent has completed basic training for handling work items of a particular skill, the amount of additional training the agent has had with regards to the particular skill, the agent's history with handling work items of a particular skill, the agent's overall performance, and any other factor which may be relevant to an agent's ability to handle work items having a particular skill requirement. In some embodiments, a skill may actually correspond to a language skill and the agent's degree of fluency in that particular language may dictate the agent's proficiency for that skill. In some embodiments, the agent's proficiency levels could also be automatically updated periodically by an external analytics engine which is evaluating the agent's performance in realtime.

The skill adjustment fields 216a, 216b may be used to store information that can be employed by the promotion/demotion module 124 to temporarily and dynamically adjust an agents skill proficiency if the state of the contact center requires such an adjustment. In some embodiments, the values in the skill adjustment fields 216a, 216b may correspond to integer values that are added or subtracted from the corresponding skill proficiency value found in the corresponding skill proficiency field 212a, 212b.

As a more specific but non-limiting example, if skill 2 is determined to be behind its service level objective and Agent 2 is selected by the promotion/demotion module 124 to have his/her skill value for skill 2 temporarily promoted, then Agent 2's proficiency value for the skill 2 proficiency will be increased from its original value of "2" to the temporary promotion value of "3." This temporary promotion value will be Agent 2's skill 2 proficiency until the Agent 2 is assigned to a work item, at which time the promotion/demotion module 124 will remove the adjustment value and the skill 2 proficiency for Agent 2 will decrease back to the original value of "2."

As another specific but non-limiting example, if skill 2 is determined to be behind its service level objective and Agent 1 is initially selected to have his/her skill value for skill 2 temporarily promoted, the promotion/demotion module 124 will determine, based on analyzing the skill 2 adjust field entry for Agent 1, that Agent 1 cannot have his/her skill promoted for skill 2. This means that either the promotion/demotion module 124 will wait until another agent is selected to have their skill proficiency promoted temporarily or the promotion/demotion module 124 will automatically select the next agent available to have their skill proficiency increased for skill 2.

In some embodiments, it may not be necessary to have a skill adjustment field 216 associated with a particular skill proficiency field 212 if the promotion/demotion module 124 is configured to promote and/or demote agent skills by a uniform and predetermined amount for any particular agent.

Figure 3:
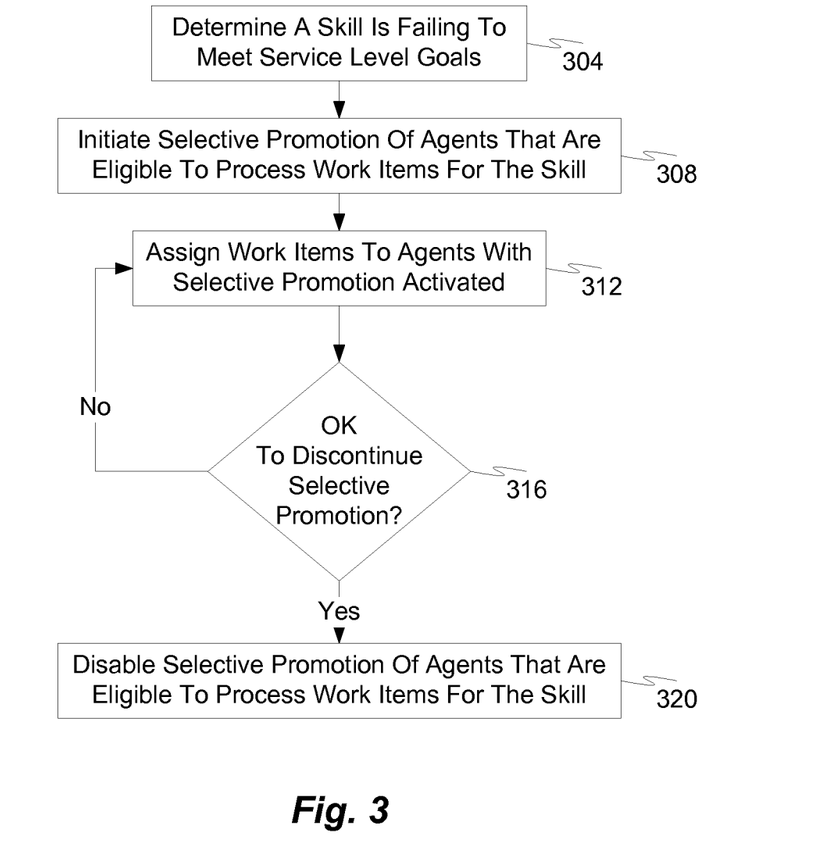
FIG. 3 is a flow diagram depicting a selective agent promotion method in accordance with embodiments of the present disclosure.

With reference now to FIG. 3, a method of selective agent promotion will be described in accordance with embodiments of the present disclosure. The method is initiated when the promotion/demotion module 124 determines that a skill level or a combination of skill levels are failing to meet one or more of their service level goals (step 304). As can be appreciated, a service level goal or objective assigned to a particular skill may be real-time, such as a target service time, or they can be based on a historical average such as an interval, daily, weekly or monthly metric such as (but not limited to) average speed of answer (ASA), percent service level (% SL), percent abandon rate (% AR), first call resolution (FCR) or customer satisfaction score (CSS). Accordingly, a service level objective for a skill may be a single numerical value or it may be determined by a combination of different metrics. More specifically, service level objective goals are more specifically defined according to the following syntax.

Period metric operator value action
Where period=interval, hour, day, week, month, or blank
Users may configure length of interval, start of day, start of week and start of month.
Where metric=Service Time, ASA, % SL, % AR, FCR, CSS
Where operator="<, <=, =, < >, >=, >".
Where value is any numeric value Where the action is a task, rule or set of rules that must be executed whenever the goal is no longer being met—This may comprise event notification, placing entry in a log, and/or some adaptive change which will impact the way in which the contact center system assigns contacts to agents. This may result in additional or fewer resources being applied to the skill in order to bring the goal back into conformance.

As a non-limiting example, an outsourcer may have a contract to meet a monthly service level objective for a particular skill of 80% in 30 seconds each month beginning on the 20th of each month. There are financial penalties when the outsourcer fails to meet this objective.

There is no advantage to the outsourcer of over-achieving and generating a very high % SL result.

Outsourcer therefore sets the following two actionable goals for a skill
Monthly % SL<80% in 30 seconds, action=promote
Monthly % SL>83% in 30 seconds, action=demote Referring back to FIG. 3, after it is determined that a particular skill is failing to meet its service level goals (e.g., Monthly % SL<80% in 30 seconds), then the promotion/demotion module 124 initiates the selective promotion of agents for the affected skill as the agents become available to process work items (step 308). In some embodiments, the promotion/demotion module 124 may employ a randomizer, which enables the promotion/demotion module 124 to randomly select whether a particular agent is going to have their skill promoted upon becoming available. Accordingly, not every agent will necessarily have their skill proficiency promoted by the promotion/demotion module 124. The randomizer can control the number of agents that are randomly selected to receive a promotion.

It should be appreciated that other methods of selectively promoting agents may be employed. For instance, rather than randomization, the system could use another attribute such as occupancy, customer satisfaction score, first call resolution scores, etc. to decide which subset of agents to promote/demote.

In some embodiments, it may be possible to implement a number of different thresholds, each associated with a different randomization value. Therefore, barely missing a service level goal (e.g., 75%≤Monthly % SL<80% in 30 seconds) could result in a small randomization value (e.g., 5% of agents which become available should be randomly selected for a promotion or demotion), which means that only a small number of agents have their skills promoted/demoted when they become available. If the service level goal is being missed by a wide margin (Monthly % SL<75% in 30 seconds), then a higher randomization value (e.g., 10%) may be used, which means that a larger number of agents have their skills promoted/demoted when they become available.

After the promotion/demotion module 124 has initiated the selective promotion of agents for the affected skill, the work assignment engine 120 will assign work items among the pool of agents, which includes at least some agents that have had their skill proficiency temporarily promoted by the promotion/demotion module 124 (step 312). This process will continue until the promotion/demotion module 124 determines that it is ok to discontinue the selective promotion of agents (step 316). In other words, the promotion/demotion module 124 may determine that the previously-affected skill is back in compliance with its service level objectives and selective promotion is no longer necessary. In some embodiments, a certain amount of hysteresis could also be followed by the promotion/demotion module 124 so that the selective promotion is not continued immediately after the skill comes back into compliance with its service level objective, but rather a certain amount of time has to pass or a certain number of agents have to be assigned to work items in the skill and the skill must remain in compliance until the query of step 316 is answered affirmatively. This can help reduce excessive switching between a promotion/demotion state and not.

If the promotion/demotion module 124 determines that the selective promotion of agents is no longer necessary, then the promotion/demotion module 124 disables the promotion process until that skill or another skill fails to meet its service level objectives (step 320).

Figure 4:
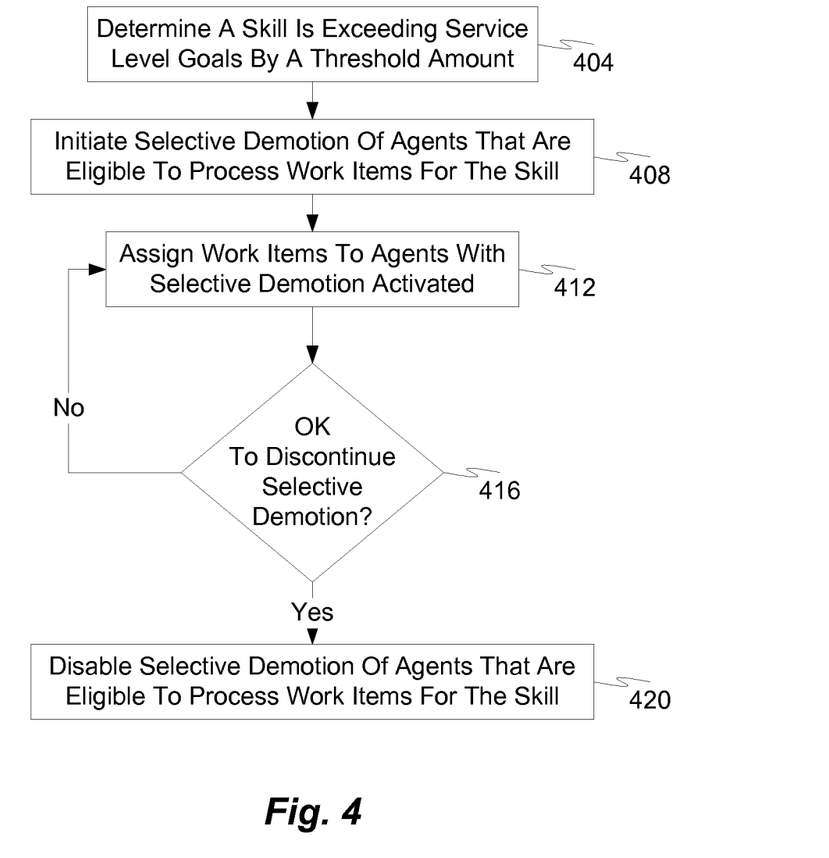
FIG. 4 is a flow diagram depicting a selective agent demotion method in accordance with embodiments of the present disclosure.

Referring now to FIG. 4, a method of selective agent demotion will be described in accordance with embodiments of the present disclosure. The method is initiated when the promotion/demotion module 124 determines that a skill level or a combination of skill levels are exceeding one or more of their service level goals by a predetermined amount (step 404). The metrics analyzed in this step may be similar or identical to the metrics analyzed in step 304; however, the thresholds, values, or rules which trigger the initiation of the selective demotion will differ from the thresholds, values, or rules which trigger the initiation of the selective promotion. As an example, step 404 may occur when Monthly % SL>83% in 30 seconds.

Thereafter, the promotion/demotion module 124 initiates the selective demotion of agents for the affected skill as the agents become available to process work items (step 408). In some embodiments, the promotion/demotion module 124 may employ a randomizer or some other mechanism to control the amount of demotion to only a subset of the agents in the contact center.

After the promotion/demotion module 124 has initiated the selective demotion of agents for the affected skill, the work assignment engine 120 will assign work items among the pool of agents, which includes at least some agents that have had their skill proficiency temporarily demoted by the promotion/demotion module 124 (step 412). This process will continue until the promotion/demotion module 124 determines that it is ok to discontinue the selective demotion of agents (step 416).

If the promotion/demotion module 124 determines that the selective demotion of agents is no longer necessary, then the promotion/demotion module 124 disables the demotion process until that skill or another skill requires the demotion (step 420).

Figure 5:
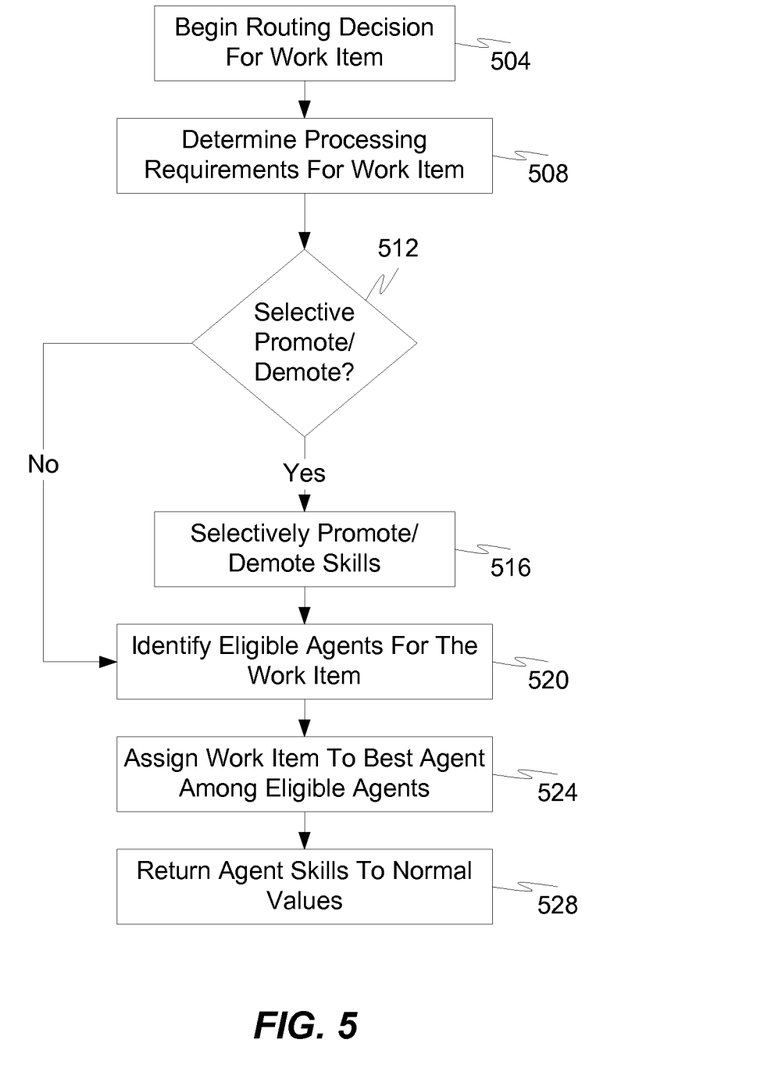
FIG. 5 is a flow diagram depicting a work item assignment method in accordance with embodiments of the present disclosure.

With reference now to FIG. 5, a work item assignment process will be described in accordance with embodiments of the present disclosure. The method begins when a new work item requires a routing decision (step 504). This may occur when a new work item is received in the contact center or anytime after a previous work item has been assigned to an agent and routed to a resource 112 associated therewith. The first step of making a work item routing decision is for the work assignment engine 120 to determine the processing requirements for the work item (step 508). This may include analyzing the processing requirements that have been determined for the work item via automated mechanisms (e.g., an IVR interaction with the customer that initiated the work item, an automated analysis of the work item content by a text analysis module, a lookup to a customer history database storing information about past contacts, analyzing the source of the work item, etc.). This may also include determining skill requirements associated with the processing requirements for the work item. The processing requirements for the work item may be placed into a bitmap for the work item, where the bitmap identifies whether certain predefined processing requirements for the work item are present.

After the processing requirements have been determined for the work item, the method continues with the work assignment engine 120 invoking the promotion/demotion module 124 to determine if selective promotion/demotion has been activated (step 512). If this query is answered affirmatively, then the promotion/demotion module 124 is configured to selectively promote or demote the skill proficiencies of a subset of agents eligible to process the work item (step 516). After the subset of agent skills have been promoted or demoted as required, or if the selective promotion/demotion was not necessary, the work assignment engine 120 continues by identifying the eligible agents from a pool of agents (step 520). The pool of agents from which the eligible agents are selected may include all agents in the contact center, regardless of whether or not the agents are available, busy, logged-in, or logged-out. However, the eligible agents may be determined based on the status of the agents.

After the eligible agents have been identified, the work assignment engine 120 analyzes the skills of the agents in the group of eligible agents to identify the agent which is best suited to process the work item (step 524). This analysis may include comparing the skill proficiencies (which may or may not be promoted from original skill proficiencies) with the processing requirements of the work item to determine the best agent for processing the work item among the group of eligible agents.

Once the work assignment engine 120 has identified the best agent for processing the work item, the work assignment engine 120 passes the agent-selection information to the routing engine 128, which routes the contact associated with the work item to the selected agent, or more specifically the resource 112 being operated by the selected agent. Thereafter, the promotion/demotion module 124 will return agent skills to normal (e.g., pre-promotion/demotion values) (step 528). In some embodiments, the promotion/demotion module 124 will return the selected agent's skill value back to normal, but will leave any other promoted or demoted values for other agents alone. In some embodiments, the promotion/demotion module 124 will return all agents skill proficiency values back to normal until another work item assignment decision is required—at which point a different subset of agents may have their skills promoted and/or demoted.

Figure 6:
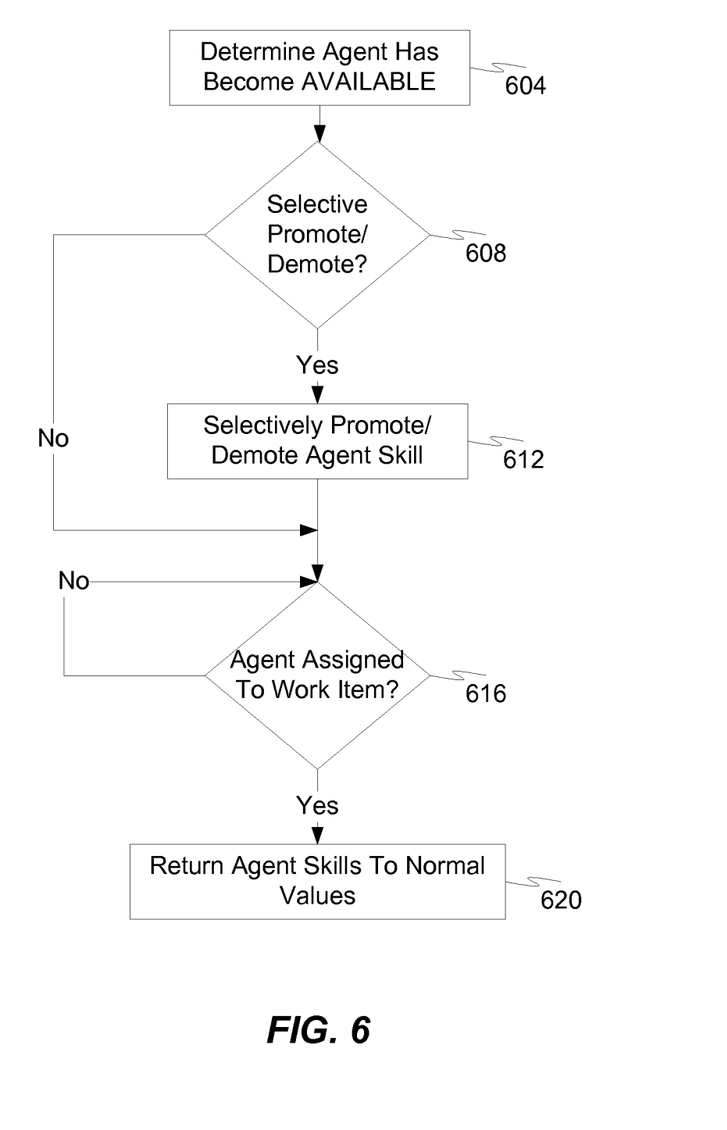
FIG. 6 is a flow diagram depicting a promotion/demotion method in accordance with embodiments of the present disclosure.

With reference now to FIG. 6, another agent promotion/demotion method will be described in accordance with embodiments of the present disclosure. This particular method enables the promotion/demotion decision to occur on an agent-by-agent basis when agents become available, rather than being triggered for each work assignment decision. Accordingly, the method begins when an agent becomes AVAILABLE (step 604). This step may occur when an agent first logs-in to the contact center system for work or it may occur after an agent completes processing a work item.

After the agent is determined to be AVAILABLE, the promotion/demotion module 124 determines for that particular agent whether or not promotion/demotion will be implemented (step 608). In some embodiments, the promotion/demotion module 124 can apply the randomizer every time an agent becomes AVAILABLE such that some of the newly-available agents are promoted/demoted and other newly-available agents are not promoted/demoted.

If the promotion/demotion module 124 determines that for this newly-available agent that promotion/demotion is to occur, then the promotion/demotion module 124 will apply the skill adjustment values as necessary for that particular agent's skill (step 612). Thereafter, or in the event that no selective promotion/demotion was applied to that agent, the method continues by determining whether or not the agent has been assigned to a work item (step 616). The promotion/demotion module 124 will not return the agent's skill levels to their originally-assigned values until the agent is assigned a work item (or until the agent logs out of the system) (step 620). Accordingly, if an agent receives a temporary promotion and/or demotion of skill proficiency values, that agent will maintain the promoted and/or demotion values until they are assigned to a work item and/or until they have logged out of the system.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    determining a state of a contact center; and
    based on determining the state of the contact center, a randomizer selecting an agent from a subset of agents to have a skill proficiency value until a predetermined amount of time has passed, wherein the skill proficiency value assigned to the agent is adjusted to accommodate the determined state of the contact center, and wherein the skill proficiency value assigned to the agent is returned to an originally-assigned skill proficiency value immediately after the agent is assigned to a work item.

2. The method of claim 1, wherein the skill proficiency value assigned to the agent and adjusted by the work assignment engine corresponds to a skill that is affected by the state of the contact center.

3. The method of claim 2, wherein the skill is determined to be at least one of (a) behind a service level objective and (b) exceeding a service level objective by more than a predetermined amount.

4. The method of claim 3, wherein the skill is determined to be behind the service level objective and wherein the skill proficiency value assigned to the agent is promoted by the predetermined amount.

5. The method of claim 3, wherein the skill is determined to be exceeding the service level objective by more than a predetermined amount and wherein the skill proficiency value assigned to the agent is demoted by the predetermined amount.

6. The method of claim 1, wherein a number of agents that are randomly selected to be included in the subset of agents is dependent upon a degree to which the contact center state differs from an ideal contact center state.

7. The method of claim 1, wherein the subset of agents is selected to have their skill proficiency values adjusted by the work assignment engine based on one or more of occupancy, customer satisfaction score, average revenue, average handle time, closure rate, performance score, and first call resolution score.

8. A non-transitory computer readable medium having stored thereon instructions that cause a computing system to execute a method, the instructions comprising:

instructions configured to determine a state of a contact center is different from an ideal contact center state and then, based on determining the state of the contact center is different from the ideal contact center state, selecting using randomization an agent from a subset of agents to have at least one skill proficiency value of the selected agent, adjusted by a work assignment engine, automatically adjust a skill proficiency value assigned to the agent working in the contact center by a predetermined amount until a predetermined amount of time has passed, wherein the skill proficiency value assigned to the agent is adjusted to bring the state of the contact center closer to the ideal contact center state, and wherein the skill proficiency value is increased by the predetermined amount until such time as the agent is assigned to a work item; and wherein the skill proficiency value is decreased by a predetermined amount in response to determining that a corresponding skill in the contact center is exceeding a predefined service level objective by more than a predetermined amount for the corresponding skill.

9. The non-transitory computer readable medium of claim 8, wherein the skill proficiency value is increased by a predetermined amount in response to determining that a corresponding skill in the contact center is failing to meet a predefined service level objective for the corresponding skill.

10. The non-transitory computer readable medium of claim 8, wherein skill proficiency value is decreased by the predetermined amount after the agent is assigned to the work item such that the skill proficiency value returns to a skill proficiency value that has been assigned to the agent based on one or more of whether or not the agent has completed basic training for handling work items of the corresponding skill, the amount of additional training the agent has had with regards to the corresponding skill, the agent's history with handling work items of the corresponding skill, and the agent's overall performance in the contact center.

11. The non-transitory computer readable medium of claim 8, wherein the predetermined amount is no more than a single increase in skill level.

12. The non-transitory computer readable medium of claim 8, wherein the state of the contact center is determined based on an analysis of one or more metrics used to determine a service level objective, wherein the one or more metrics comprise service time, average speed of answer, percent service level, percent abandon rate, first call resolution, and customer satisfaction score.

13. A contact center, comprising:

a work assignment engine configured to determine that a state of the contact center is different from an ideal contact center state and then, based on determining that the state of the contact center is different from the ideal contact center state, selecting, using randomization, a subset of agents to have at least one skill proficiency value of the selected agent, adjusted by a work assignment engine, temporarily and automatically adjust skill proficiency values of the subset of agents in the contact center by a predetermined amount and for a predetermined amount of time to bring the state of the contact center closer to the ideal contact center state, and wherein the skill proficiency value assigned to the agent is returned to an originally-assigned skill proficiency value immediately after the agent is assigned to a work item.

14. The contact center of claim 13, wherein the number of agents in the subset is dependent upon a degree to which the state of the contact center differs from the ideal contact center state and wherein an agent is removed from the subset upon being assigned to a work item.

15. The contact center of claim 13, wherein the subset of agents are selected based on one or more of occupancy, customer satisfaction score, and first call resolution scores and wherein an agent is removed from the subset upon being assigned to a work item.

16. The method of claim 1, further comprising:

executing a processing loop if the determined state of the contact center differs from an ideal state of the contact center; and wherein the processing loop, further comprises, the automatically adjusting, by the work assignment engine, the skill proficiency value assigned to the agent working in the contact center by the predetermined amount until the predetermined amount of time has passed.

17. The non-transitory computer readable medium of claim 8, wherein the number of agents in the subset is dependent upon a degree to which the state of the contact center differs from the ideal contact center state and wherein an agent is removed from the subset upon being assigned to a work item.

18. The non-transitory computer readable medium of claim 8, wherein the subset of agents are selected based on one or more of occupancy, customer satisfaction score, and first call resolution scores and wherein an agent is removed from the subset upon being assigned to a work item.

19. The contact center of claim 13, wherein the state of the contact center is determined based on an analysis of one or more metrics used to determine a service level objective, wherein the one or more metrics comprise service time, average speed of answer, percent service level, percent abandon rate, first call resolution, and customer satisfaction score.

* * * * *